United States Patent [19]

Scholz et al.

[11] Patent Number: 5,536,787
[45] Date of Patent: Jul. 16, 1996

[54] REPULPABLE PRESSURE-SENSITIVE ADHESIVE COMPOSITIONS

[75] Inventors: William F. Scholz, Altadena; Robert H. Van Ham; Richard P. Randall, both of Pasadena, all of Calif.

[73] Assignee: Avery Dennison Corporation, Pasadena, Calif.

[21] Appl. No.: 484,152

[22] Filed: Jun. 7, 1995

Related U.S. Application Data

[60] Division of Ser. No. 211,763, Apr. 14, 1994, which is a continuation-in-part of Ser. No. 799,555, Nov. 27, 1991, abandoned, which is a continuation-in-part of Ser. No. 777,667, Oct. 15, 1991, Pat. No. 5,196,504.

[51] Int. Cl.$^6$ ............................................. C08L 33/02
[52] U.S. Cl. ..................... 525/221; 526/318.4; 524/460
[58] Field of Search ...................... 525/221; 526/318.4; 524/460

[56] References Cited

U.S. PATENT DOCUMENTS 5,196,504  3/1993  Scholz et al. .

Primary Examiner—Joseph L. Schofer
Assistant Examiner—N. Sarofim
Attorney, Agent, or Firm—Christie, Parker & Hale

[57] ABSTRACT

A water-dispersible, inherently tacky pressure-sensitive adhesive comprising a tacky emulsion polymer formed of from about 80% to 90% by weight of monomers comprising a major portion of at least alkyl acrylate containing from 4 to about 8 carbon atoms in the alkyl group and from about 20% to 10% by weight of a mixture of acrylic acid with at least an oleophilic unsaturated carboxylic acid, said emulsion polymer formed in the presence of anionic and nonionic surfactants to provide a polymer having a glass transition temperature of −15° to −50° C. A sufficient amount of chain transfer agent is employed to provide an emulsion polymer which when coated on a repulpable paper substrate enables recovery of paper fibers substantially free of adhesive under conditions of TAPPI Useful Method 213 and/or 204, and resistant to loss of adhesive properties on exposure to high humidity.

26 Claims, No Drawings

REPULPABLE PRESSURE-SENSITIVE ADHESIVE COMPOSITIONS

CROSS-REFERENCE TO RELATED APPLICATION

This is a divisional of application Ser. No. 08/211,763 filed Apr. 14, 1994, which is a continuation in part of application Ser. No. 799,555 filed Nov. 27, 1991 abandoned which is a continuation-in-part of application Ser. No. 777,667 filed Oct. 15, 1991 U.S. Pat. No. 5,196,504.

BACKGROUND OF THE INVENTION

The present invention relates to water- or alkali-dispersible emulsion polymer systems which are functional as pressure-sensitive adhesives. The adhesives of the instant invention provide an ecologically friendly replacement for pressure-sensitive adhesives which hinder clean paper recovery during repulping.

For a label or tape constructions to be repulpable, the adhesive must, for some markets, be water dispersible or cold water soluble and, for such markets, pass Tappi Useful Method 213 (Tappi UM 213) "Repulpability of Splice Adhesive Compositions," incorporated herein by reference.

Other markets which utilize hot water or alkali for repulping accept a different test. A product which passes a Tappi Useful Method 204 (Tappi UM 204), a de-inking and repulping test incorporated herein by reference will also satisfy requirements for elevated temperature alkali repulping.

Most rubber-based and acrylic adhesive systems are not repulpable. During the repulping process (fiber shearing), the adhesives tend to agglomerate and form globules, commonly referred to in the trade as "stickies." Stickies adversely affect paper quality and have a negative impact on the process of recycling paper.

Several approaches can be taken to remove adhesive stickies. One has been to use water-dispersible adhesive microspheres prepared by processes described in U.S. Pat. Nos. 3,691,140 to Silver, 4,155,152 to Baker et al., 4,495,318 and 4,598,212 to Howard, and 4,810,763 to Mallya et al., each incorporated herein by reference, and applied at appropriately low coat weights. While the adhesives disperse in the paper fiber adequately during the repulping process, the adhesive is not removed from the paper fibers. Rather, the adhesive microspheres accumulate in the paper fibers, reducing paper quality and limit the number of times the paper fibers can be repulped or recycled.

Water-soluble adhesive systems which provide for complete adhesive removal from the fiber have been used commercially. Typically, commercial water-soluble products have suffered from (a) poor shelf life (the tape or label is sold in a sealed plastic bag); (b) poor humidity and/or heat-aged performance; and (c) a propensity to bleed into the paper facestock (which reduces peel performance). Each of these problems is related to the high water-sensitivity of the respective products. Such water-soluble adhesives and tapes are described, for instance, in U.S. Pat. Nos. 3,441,430 to Peterson; 3,865,770 to Blake, 4,052,368 to Larson, 4,413,080 to Blake, and 4,569,960 also to Blake, each incorporated herein by reference.

There is a need therefore to provide adhesives for a general purpose label and tape construction which are repulpable and not sensitive to changes in relative humidity and where no special precautions are required for storage or use as an adhesive for a label or tape.

SUMMARY OF THE INVENTION

According to the present invention, there is provided an adhesive system which comprises inherently tacky water-dispersible pressure-sensitive adhesives formed by emulsion polymerization of from about 55% to about 90% by weight of nonacid monomers, predominantly alkyl acrylates, interpolymerized with from about 10% to about 20% of a mixture of acrylic acid and at least one oleophilic unsaturated carboxylic acid, preferably a mixture of acrylic acid with methacrylic acid, with some portion of the polymerization occurring in the presence of a chain transfer agent. The repulpable pressure-sensitive adhesives have a glass transition temperature in the range of about $-15°$ to $-50°$ C. and are preferably formed in the presence of a mixture of nonionic and anionic surfactants.

Useful repulpable pressure-sensitive adhesive polymers may be prepared by one stage of emulsion polymerization, sequential polymerization or by blending separately formed emulsion polymers. Sequential emulsion polymerization is preferred. However formed, the emulsion pressure-sensitive adhesives ma be blended with other adhesive polymers to control bleed without loss of repulpable properties as set by Tappi UM 204. Tackifiers can be used to enhance adhesion to substrates such as cardboard. External or internal crosslinking of the polymer can be used to enhance cohesive strength and reduce bleed into porous paper substrates. Pressure-sensitive compositions contemplated to be formed in accordance with the instant invention pass TAPPI UM 204. Adhesives or blends of adhesives may also pass Tappi UM 213.

The presently preferred pressure-sensitive adhesive compositions are based on a copolymer of 2-ethylhexyl acrylate, methyl acrylate, vinyl acetate, methacrylic acid and acrylic acid in which the acid content is from about 10% to about 20% by weight of the polymer and arylic acid comprises from about 30% to about 90% by weight of the total unsaturated carboxylic acids, and formed by sequential polymerization in which about 40% to 80% of the monomers are polymerized in a first stage, followed by addition of the balance of the monomers. Sequential polymerization appears to provide the best balance of adhesive properties, dispersibility and humidity resistance.

Some portion of the preferred adhesive polymers used as a repulpable product is polymerized in the presence of from about 0.5% to about 1.5% by weight of the monomers of a chain transfer agent, preferably n-dodecyl mercaptan. There may be optionally added an internal crosslinker during polymerization or, after polymerization, an external crosslinker to enhance cohesive strength and reduce paper bleed.

There may also be added to reduce bleed certain amounts of other emulsion polymers which enable the adhesive to pass Tappi UM 213 and/or Tappi UM 204.

The preferred repulpable pressure-sensitive adhesive polymers contain about 55% to about 90% by weight of an alkyl acrylate containing from 4 to about 8 carbon atoms in the alkyl group, from about 1% to about 15% by weight methacrylic acid, about 5% to about 19% by weight acrylic acid, from 0% to about 15% by weight vinyl acetate and from 0% to about 15% by weight methyl acrylate formed in the presence of 0% to 1.5% by weight of the monomers of n-dodecyl mercaptan and from about 0% to 5% of the weight of the monomers of aluminum acetate as the external crosslinker and/or an internal crosslinker.

The presently preferred repulpable pressure-sensitive adhesive composition is a mixture of about 85.5% by weight of a sequentially polymerized polymer system containing about 60% by weight 2-ethylhexyl acrylate, about 12.5% by weight vinyl acetate, about 12.5% by weight methyl acrylate, about 13.5% by weight acrylic acid and about 1.5% by weight methacrylic acid, blended with about 4.5% by weight of a copolymer containing about 56.8% 2-ethylhexyl acrylate, about 37.8% by weight butyl acrylate about 1.9% by weight acrylic acid, about 3.8% by weight methacrylic acid, and about 0.6% by weight with itaconic acid, tackified with about 10 parts by weight of a rosin ester.

The adhesive is coated, typically to a coat weight of 20–25 g/m² and applied as a continuous coat on a label or tape backing or face stock. Such a product has the property of being re-emulsified or dispersed under the action of water, with or without agitation.

Monomers such as diallyl maleate formed in the absence of a chain transfer agent such as n-dodecyl mercaptan may also be used as such if they pass Tappi UM 213 and/or UM 204 or if when added to an adhesive formed in the presence of n-dodecyl mercaptan will pass Tappi UM 213 and/or UM 204.

DETAILED DESCRIPTION

The present invention relates to water-dispersible inherently tacky pressure-sensitive adhesive polymers for repulpable paper label and tape applications. When employed with repulpable paper label and tape stock, the adhesives have the capability of being dispersed in cold water and/or hot alkali solution (88° C. or more) and enable recovery of paper fiber free of contamination by the adhesive.

The pressure-sensitive adhesives useful in the instant invention are prepared by batch (single stage) or sequential polymerization or by blending of batch polymers. Glass transition temperature as measured by DSC (Differential Scanning Colorimetry) of the final polymer or blend of polymers is in the range from about –15° C. to –50° C. Repulpability requires limiting molecular weight of some amount of the polymer. This may be accomplished by utilizing as the adhesive polymer or a component of a polymer blend, an adhesive polymer formed in the presence of a chain transfer agent, preferably n-dodecyl mercaptan, at a concentration providing a net polymer blend having a good balance of dispersibility, pressure-sensitive adhesive performance, humidity resistance and a resistance to bleed.

The emulsion formed pressure-sensitive adhesives of the instant invention contain, on a percent by weight basis, from about 55 to about 90% by weight total of one or more alkyl acrylates containing from 4 to about 8 carbon atoms in the alkyl group. Useful alkyl acrylates include n-butyl acrylate, 2-ethylhexyl acrylate, isooctyl acrylate, and the like, as well as mixtures thereof.

Other modifying monomers may be effectively employed so long as the glass transition temperature of the final adhesive remains in the range of from about –15° C. to –50° C. Representative modifying monomers include lower alkyl acrylate such as a methyl acrylate; vinyl esters, such as vinyl acetate, vinyl butyrate, vinyl propionate, vinyl isobutyrate, vinyl valerate, vinyl versitate, and the like; and diesters of an unsaturated dicarboxylic acid and mixtures thereof, such as di-2-ethyl hexyl maleate, di-2-ethyl hexyl fumarate, and dibutyl fumarate and the like.

When employed, vinyl acetate and methyl acrylate improve the hydrophilic characteristic of the polymers, with methyl acrylate further acting to improve cohesive strength. Vinyl acetate and methyl acrylate are each employed in a concentration of 0% to 15% by weight, and preferably in equal amounts.

Other preferred acrylate monomer combinations system employ a mixture of 2-ethylhexyl acrylate and butyl acrylate with the preferred ratio of 2-ethylhexyl acrylate to butyl acrylate being about 3 to 1.

The essential component of the repulpable polymers is a blend of acrylic acid with at least one unsaturated oleophilic carboxylic acid, such as methacrylic acid and itaconic acid and the like, with a ratio of acrylic acid to oleophilic acid being from about 2:3 to about 7:1. The total carboxylic acid content of the polymer is from 10% to about 20% by weight. Blends of acrylic acid and methacrylic acid are preferred in which acrylic acid is present in a concentration of about 5% to about 19% by weight of the polymer and methacrylic acid is employed in a Concentration of about 1% to about 15% weight of the polymer.

By the term "oleophilic" carboxylic acid as used herein there is meant unsaturated carboxylic acids which are more soluble in the monomeric oil phase of the emulsion than acrylic acid.

In all emulsion polymerization systems, monomers homopolymerize and copolymerize. We have found that an oleophilic unsaturated carboxylic acid, such as methacrylic acid, is not only preferentially soluble in and copolymerizes with alkyl acrylates, but enhances the solubility of acrylic acid in such monomers to promote copolymerization of acrylic acid with the alkyl acrylates.

When employed, butyl acrylate adds stiffness to the copolymer, methacrylic acid promotes acrylic acid copolymerization, and acrylic acid enhances adhesion to polar surfaces.

All or a portion of the emulsion pressure-sensitive adhesive polymers used in the instant invention are prepared in the presence of a chain transfer agent present in an amount of from about 0.5% to about 1.5% by weight of the monomers, preferably from about 0.75% to about 1.25% by weight of the monomers. The preferred chain transfer agent is n-dodecyl mercaptan or t-dodecyl mercaptan.

The repulpable emulsion pressure-sensitive adhesive polymers are prepared by providing an initial charge to a polymerization reactor of an aqueous solution containing a nonionic surfactant which is preferably an ethoxylated rosin acid emulsifier, most preferably an ethoxylated rosin acid emulsifier containing about 46 ethylene oxide groups per molecule. There is added to the initial charge in the reactor a small amount of the monomers separately prepared in a pre-emulsion containing anionic surfactant, preferably a sulfated ethoxylated nonylphenol containing about 6 ethylene oxide units per molecule and a free radical initiation system. The presently preferred nonionic surfactant is AR-150 manufactured and sold by Hercules. The presently preferred anionic surfactant is Alipal CO-436 manufactured by Rhone Poulenc. The amount of nonionic surfactant employed may be from about 4% to about 8% by weight of the initial reactor charge, with anionic surfactant concentration being from about 2.5% to about 5% by weight of the monomers in the pre-emulsion.

The reaction is redox initiated and the remaining pre-emulsified monomers are added incrementally i.e., intermittently or continuously over a period of time.

While, as previously indicated, the monomers can be added in one pre-emulsion charge, it is preferred that the monomers be sequentially added. It is presently preferred that from about 40% to about 80% of the total monomers be incrementally added to the initial charge and essentially totally reacted following by the incremental addition of the remainder of the monomers in a second pre-emulsion for reaction in the reactor. Excellent results have been obtained in sequential polymerization where the first charge of monomers contains about 15% to 20% by weight carboxylic acid, and the second charge of monomers contains about 10% to 25% by weight carboxylic acid. Independent of the amount of acid employed in any given charge, the net repulpable product should contain about 10% to about 20% by weight polymerized carboxylic acids in which acrylic acid is present in an amount from about 30 to about 90% by weight of the carboxylic acids.

We have found in general that the amount of chain transfer agent employed provides a tradeoff between dispersibility, adhesive performance and humidity resistance, with the amount of chain transfer agent employed being inversely proportional to the amount of acid in the charge. It is believed the presence of high level of carboxylic acid in the polymer enhances water-dispersibility, and therefore the polymer can have a higher molecular weight. This allows a reduction in the amount of chain transfer agent employed. At lower carboxylic acid concentrations, the polymer is less dispersible and therefore more chain transfer agent is required to reduce molecular weight. As molecular weight is reduced, the tendency of the polymer to bleed into a porous paper facestock is increased. This enhances, for some applications, the desirability of adding to the monomers an internal crosslinker such as diallyl maleate or an external crosslinker such as aluminum acetate. With the external crosslinker, crosslinking occurs after polymerization. Crosslinkers may be used in a concentration of up to about 1% by weight of the monomers, typically from about 0.2% to about 0.6% by weight of the monomers.

Bleed can also be controlled by adding modifying acrylate polymers of an acid content less than about 10% by weight. The presently preferred additive polymers are externally prepared emulsion polymers. They are employed in a concentration of 0% to about 40% by weight of the total polymers. One such polymer is a copolymer of 2-ethylhexyl acrylate and butyl acrylate, containing about 2% by weight acrylic acid and about 3% by weight methacrylic acid with about 0.6% by weight itaconic acid formed by emulsion polymerization.

Water-dispersible pressure-sensitive adhesive polymers prepared by emulsion polymerization are described in detail herein. To be satisfactory, at least one polymer component of a composition must pass a wash-off screening test. In this test, the adhesive is coated onto a 2 mil polyester film at a coat weight of 20–25 g/m², dried in an oven at 70° C. for 15 minutes, cooled to room temperature, and then held under a water tap to determine if the adhesive turns milky. If so then the adhesive has the ability to be dispersed or re-emulsified or washed from a surface. This may also be established by placing a sample in a beaker of water and allowing the sample to stand to determine if the water in the beaker turns milky. A third screening test is to simply place drops of water on the adhesive surface and rub the water into the surface. If the water turns milky the adhesive is probably dispersible.

The following Examples and Controls are to illustrate the invention. In respect to Table IV, "E" means an Example representative of the invention; "C" means Control; a formulation which did not pass criteria for dispersibility; including a wash-off ("WO") screening test. The requirement for ultimate re-pulpability means passing of TAPPI UM 213 and/or UM204. A requirement for being useful as a pressure-sensitive adhesive is passing, or at least marginally passing, a cardboard adhesion ("CA") test which is a manual looptack adhesion to recycled cardboard. In respect to Table IV "EHA" means 2-ethyl hexyl acrylate, "BA" means butyl acrylate, "VA" means vinyl acetate, "MA" means methyl acrylate, "MAA" means methacrylic acid, "AA" means acrylate acid, "DAM" means diallyl maleate, "DDM" means n-dodecyl mercaptan. "A" means single incremental addition polymerization, "S" means sequential, two stage incremental addition polymerization, and "B" means a blend of two separate "A" type polymers. With respect to an Example or Control involving sequential polymerization or a blend ("a") means the composition of the first stage pre-emulsion monomer addition or the first polymer of a blend of polymers and ("b") means the composition of the second stage of pre-emulsion monomer additional or the second polymer of a blend. AR-150 is a nonionic ethoxylated rosin acid emulsifier manufactured by Hercules and containing approximately 46 units of ethylene oxide per molecule. Alipal CO-436 is manufactured and sold by Rhone Poulenc and is a sulfonated ethoxylated nonylphenol containing 6 units of ethylene oxide per molecule. Triton X-100 is a octylphenoxy polyethoxyethanol nonionic surfactant having a HLB value of 13.5 and Triton X-165 is a nonionic octylphenoxy polyethoxyethanol having a HLB value of 15.8 both are manufactured by Union Carbide. Vinol (now AIRVOL 203) is a polyvinyl alcohol protective colloid manufactured and sold by Air Products, Inc. In terms of performance, "F" means fail, "P" means pass, and "M" means marginal. 50# EDP means electronic data alkaline processed paper at a 50 pound per ream weight. "WO" means wash-off in one or all combinations of three tests described above. "CA" Cardboard Looptack Adhesion by the manual test. "OB" means an overnight bleed test to determine if at 50° C., the adhesive bleeds into and produce a visible stain on 50# EDP paper. "HH" means high humidity and again a visible stain on exposure to 90% humidity, at 25° C. for one week. Pass in any bleed test means no visible stain. "Tappi" means TAPPI UM213 and/or 204.

Examples 1–8 and Controls 1–5 are for compositions involving single-stage polymerization where monomers in the weight percent shown were polymerized in a single stage by addition of a pre-emulsion containing Alipal CO 436 as the surfactant in the concentration shown to a reactor containing an initial charge of water, AR-150 as the surfactant, and ferric ethylenediaminetetraacetic acid and potassium persulfate in amounts shown below.

The presently preferred polymerization procedure involving sequential addition of monomers pre-emulsions and is specific for adhesive of Examples E-10 as well as general to Examples E-9 to 11 and, Controls C-6 to C-9.

To a reaction vessel there was added materials shown in Table I.

TABLE I

| Component | Grams |
|---|---|
| WATER | 150 |
| AR-150 | 40 |
| Fe EDTA[1] | 0.1 |

[1]Fe EDTA — Ferric salt of ethylenediaminetetraacetic acid.

The mixture was heated to 70° C. and treated with hydrogen peroxide for one half hour, then allowed to cool to 50° C. at which time there was added 3 grams $K_2S_2O_8$ and 9 grams of $NaHCO_3$.

There was separately formed, a pre-emulsion of the composition shown in Table II.

TABLE II

| Ingredient | % Monomers | Grams |
|---|---|---|
| Water | | 255 |
| Alipal CO-436 (60%) | | 40 |
| $K_2S_2O_8$ | | 2.4 |
| 2EHA | 61 | 384 |
| BA | 20.3 | 128 |
| MAA | 12.2 | 76.8 |
| AA | 6.5 | 41.2 |
| Catalyst, tertiarybutylhydroperoxide (t-BHP) Chain transfer agent, n-dodecyl mercaptan (n-DDM) | | 7.2 |

There is also formed a second pre-emulsion of the composition shown in Table III.

TABLE III

| Ingredient | % Monomers | Grams |
|---|---|---|
| Water | | 75 |
| Alipal CO436 (60%) | | 10 |
| $K_2S_2O_8$ | | 0.6 |
| 2EHA | 58.2 | 96 |
| BA | 29.1 | 48 |
| MAA | 8.8 | 14.6 |
| AA | 3.9 | 6.4 |
| t-BHP | | 0.6 |
| n-DDM | | 1.8 |

50 grams of the first pre-emulsion was charged to the reactor at 50° C. and the balance incrementally added over a two hour period. Following completion of addition of the first pre-emulsion there was started the incremental addition of the second pre-emulsion over a one hour period. The properties of the polymer formed are shown in Example 10 of Table IV.

TABLE IV

| E/C | | EHA | BA | MAA | AA | DDM | MODE | % POLYMER |
|---|---|---|---|---|---|---|---|---|
| E-1 | | 60 | 20 | 12 | 8 | 0.50 | A | 100 |
| E-2 | | 60 | 20 | 12 | 8 | 1.00 | A | 100 |
| E-3 | | 60 | 20 | 12 | 8 | 1.50 | A | 100 |
| C-1 | | 60 | 30 | 6 | 4 | 0.00 | A | 100 |
| C-2 | | 60 | 30 | 6 | 4 | 0.25 | A | 100 |
| E-4 | | 60 | 30 | 6 | 4 | 0.25 | A | 100 |
| E-5 | | 60 | 30 | 6 | 4 | 0.50 | A | 100 |
| E-6 | | 60 | 30 | 6 | 4 | 0.50 | A | 100 |
| E-7 | | 60 | 20 | 8 | 12 | 1.50 | A | 100 |
| E-8 | | 60 | 30 | 4 | 6 | 0.50 | A | 100 |
| C-3 | | 60 | 30 | 6 | 4 | 0.50 | A | 100 |
| C-4 | | 60 | 30 | 6 | 4 | 0.25 | A | 100 |
| C-5 | | 60 | 30 | 6 | 4 | 0.50 | A | 100 |
| E-9 | (a) | 61.0 | 20.3 | 12.2 | 6.5 | 1.14 | S | 80 |
| | (b) | 58.2 | 29.1 | 8.8 | 3.9 | 1.09 | S | 20 |
| E-10 | (a) | 61.0 | 20.3 | 12.2 | 6.5 | 0.80 | S | 80 |
| | (b) | 58.2 | 29.1 | 8.8 | 3.9 | 0.76 | S | 20 |
| C-6 | (a) | 61.0 | 20.3 | 12.2 | 6.5 | 0.57 | S | 80 |
| | (b) | 58.2 | 29.1 | 8.8 | 3.9 | 0.54 | S | 20 |
| C-7 | (a) | 61.0 | 20.3 | 12.2 | 6.5 | 1.14 | S | 80 |
| | (b) | 58.2 | 29.1 | 8.8 | 3.9 | 1.09 | S | 20 |
| E-11 | (a) | 61.0 | 20.3 | 12.2 | 6.5 | 1.14 | S | 80 |
| | (b) | 58.2 | 29.1 | 8.8 | 3.9 | 1.09 | S | 20 |
| C-8 | (a) | 61.0 | 20.3 | 12.2 | 6.5 | 0.00 | S | 80 |
| | (b) | 58.2 | 29.1 | 8.8 | 3.9 | 0.00 | S | 20 |
| C-9 | (a) | 61.0 | 20.3 | 12.2 | 6.5 | 0.00 | S | 80 |
| | (b) | 58.2 | 29.1 | 8.8 | 3.9 | 2.18 | S | 20 |
| C-10 | (a) | 60 | 20 | 12 | 8 | 1.00 | B | 50 |
| | (b) | 60 | 30 | 6 | 4 | 0.25 | B | 50 |
| E-12 | (a) | 60 | 20 | 12 | 8 | 1.00 | B | 85 |
| | (b) | 60 | 30 | 6 | 4 | 0.25 | B | 15 |
| E-13 | (a) | 60 | 20 | 12 | 8 | 1.00 | B | 90 |
| | (b) | 60 | 30 | 6 | 4 | 0.25 | B | 10 |
| E-14 | (a) | 60 | 20 | 12 | 8 | 1.00 | B | 95 |
| | (b) | 60 | 30 | 6 | 4 | 0.25 | B | 5 |

| E/C | INITIAL SURFACTANT | % | PRE EMULSION SURFACTANT | % | WO | CA | OB | HH | |
|---|---|---|---|---|---|---|---|---|---|
| E-1 | AR-150 | 5.00 | CO-436 | 3.75 | M | P | P | P | F |
| E-2 | AR-150 | 5.00 | CO-436 | 3.75 | P | P | P | P/M | P |
| E-3 | AR-150 | 5.00 | CO-436 | 2.52 | P | P | P | F | P |
| C-1 | AR-150 | 5.00 | CO-436 | 2.75 | F | — | P | — | — |
| C-2 | AR-150 | 7.50 | CO-436 | 2.52 | M | — | P | — | — |
| E-4 | AR-150 | 5.00 | CO-436 | 2.52 | M | P | P | P | M |
| E-5 | AR-150 | 7.50 | CO-436 | 3.75 | M | M | P | F | M |
| E-6 | AR-150 | 5.00 | CO-436 | 2.52 | P | P | P | F | P |

TABLE IV-continued

| | | | | | | | | | | |
|---|---|---|---|---|---|---|---|---|---|---|
| E-7 | | AR-150 | 5.00 | CO-436 | 3.75 | P | P | F | F | P |
| E-8 | | AR-150 | 1.25 | CO-436 | 3.50 | P | P | P | F | P |
| C-3 | | Vinol | 7.50 | CO-436 | 2.25 | F | — | — | — | — |
| C-4 | | Vinol | 10.00 | CO-436 | 3.00 | M | — | F | — | — |
| C-5 | | Vinol | 10.00 | CO-436 | 3.00 | M | — | F | — | — |
| E-9 | (a) | AR-150 | 5.00 | CO-436 | 3.80 | P | P | P | F | P |
| | (b) | AR-150 | 5.00 | CO-436 | 3.60 | | | | | |
| E-10 | (a) | AR-150 | 5.00 | CO-436 | 2.66 | P | P | P | M | P |
| | (b) | AR-150 | 5.00 | CO-436 | 2.52 | | | | | |
| C-6 | (a) | AR-150 | 5.00 | CO-436 | 1.90 | M | P | P | M+ | F |
| | (b) | AR-150 | 5.00 | CO-436 | 1.80 | | | | | |
| C-7 | (a) | Triton X165 | 5.00 | CO-436 | 3.80 | M | M | — | M | — |
| | (b) | Triton X165 | 5.00 | CO-436 | 3.60 | | | | | |
| E-11 | (a) | Triton X165 | 5.00 | CO-436 | 3.80 | P | M | — | M | — |
| | (b) | Triton X165 | 5.00 | CO-436 | 3.60 | | | | | |
| C-8 | (a) | None | 0.00 | CO-436 | 3.80 | F | — | — | — | — |
| | (b) | None | 0.00 | CO-436 | 3.60 | | | | | |
| C-9 | (a) | None | 0.00 | CO-436 | 3.80 | F | — | — | — | — |
| | (b) | None | 0.00 | CO-436 | 3.60 | | | | | |
| C-10 | (a) | AR-150 | 5.00 | CO-436 | 3.75 | — | P | P | P | F |
| | (b) | AR-150 | 7.50 | CO-436 | 2.52 | | | | | |
| E-12 | (a) | AR-150 | 5.00 | CO-436 | 3.75 | — | M | P | P | P |
| | (b) | AR-150 | 7.50 | CO-436 | 2.52 | | | | | |
| E-13 | (a) | AR-150 | 5.00 | CO-436 | 3.75 | — | M | P | F | P |
| | (b) | AR-150 | 7.50 | CO-436 | 2.52 | | | | | |
| E-14 | (a) | AR-150 | 5.00 | CO-436 | 3.75 | — | M | P | F | P |
| | (b) | AR-150 | 7.50 | CO-436 | 2.52 | | | | | |

The chain transfer agent level is also used to ensure repulpability while maintaining adhesive performance. An excess of the amount of chain transfer agent results in polymers with poor adhesive properties. Too little chain transfer agent results in an inability to repulp the adhesive polymer. Increasing the amount of chain transfer agent reduces the polymer molecular weight and conversely decreasing the amount of chain transfer agent increases the polymer molecular weight. One could also increase or decrease polymer molecular weight by other means such as changing polymerization temperature to achieve adequate dispersibility.

On the average, the amount of n-dodecyl mercaptan found to be most functional is about 1%±0.5% by weight based on the total weight of the monomers.

For Examples E-12 to E-14 and Control 10 blends of polymers were used, each polymer being polymerized in a manner used for individual polymerization. The individual polymers were blended in a proportion of 50% to 95% (a) polymer and 50 to 5% (b) polymer. As indicated by Table IV the presence of dodecyl mercaptan at about 0.5% for a single batch polymerization was marginal as to utility of the product and at 1.5% marginal with respect to utility as to bleed. To our surprise, however, two stage sequential monomers addition provided a more aggressive adhesive than a blend of polymers and allowed a reduction of n-dodecyl mercaptan to achieve the same overall adhesive performance.

Using a sequential polymerized procedure as generally set forth above, the polymers of the Example E-15 to E-19 were prepared with the relative proportions of monomer and polymer properties set forth in Table V.

TABLE V

| Examples | E-15 | E-16 | E-17 | E-18 | E-19 |
|---|---|---|---|---|---|
| Sequential Polymerization Monomers | yes | yes | yes | yes | yes |
| Ratio 1st stage/2nd stage | 2/3 | 2/3 | 2/3 | 2/3 | 2/3 |
| 1st Stage, Wt % Monomer | | | | | |
| 2-EHA | 60 | 60 | 60 | 60 | 72.4 |
| VAc | 12.5 | 12.5 | 12.5 | 12.5 | 13.7 |
| MA | 12.5 | 12.5 | 12.5 | 12.5 | 13.7 |
| AA | 11.25 | 11.25 | 11.25 | 11.25 | |
| MAA | 3.75 | 3.75 | 3.75 | 3.75 | |
| DAM | 0 | 0 | 0 | 0 | 0.2 |
| n-DDM | 0 | 0 | 0 | 0 | 0 |
| 2nd Stage, Wt % Monomer | | | | | |
| 2-EHA | 60 | 60 | 60 | 60 | 34.4 |
| VAc | 12.5 | 12.5 | 12.5 | 12.5 | 27.9 |
| MA | 12.5 | 12.5 | 12.5 | 12.5 | 27.9 |
| AA | 15 | 15 | 15 | 15 | 7.8 |
| MAA | 0 | 0 | 0 | 0 | 2.0 |
| n-DDM | 0.3 | 0.3 | 0.66 | 0.83 | 2.2 |

TABLE V-continued

| Examples | E-15 | E-16 | E-17 | E-18 | E-19 |
|---|---|---|---|---|---|
| Cold Water Wash-Off | good | good | good | good | good |
| Cardboard Adhesion | good | good | good | good | marginal |
| Shear 500 g wt ¼ sin 2 mil Mylar film | 71 min c/p | 180 min c/p | 142 min c/p | 68 min | 14 min |
| 2 mil Mylar film | | | | | |
| 90% RH, 40° C. | | marginal | marginal | marginal | |
| TAPPI UM 204 | pass | pass | pass | pass | pass |
| Comments | rxn temp 50–55° C. | rxn temp 68–72° C. | rxn temp 68–72° C. | rxn temp 68–72° C. | rxn temp 68–72° C. |
| Solids (%) | 50 | | | | |
| Viscosity (cP) | 7000 | | | | | rxn = polymerization temperature

The repulpable pressure-sensitive adhesives of the instant invention are ecologically friendly and are adaptive for use with a variety of paper backing or stock including paper stock useful in the postal industry such as papers used for stamps, labels, envelopes and the like. Such papers include alkaline-processed papers, acid-processed papers and pre-phosphorized-acid-processed papers.

When the adhesives are combined with a paper face stock paper used for stamps the adhesive will be applied over a water soluble layer which allows separation of the stamp face stock from the adhesive and providing on the opposed surface with means to enable identification of the location of a stamp on a properly stamped envelope to enable an automatic cancellation machine to determine if the envelope can be automatically cancelled or rejected for hand cancellation.

The preferred means of identification of a stamp is a zinc orthosilicate (Taggant) contained in the paper or applied as coating thereto. The under surface of the face stock is coated with a water soluble layer which allows through soaking for a period of no more than 30 minutes separation of the stamp face from the adhesive for stamp collector purposes. The next layer in the construction is the pressure-sensitive adhesive of the instant invention applied as an acrylic emulsion.

The pressure-sensitive adhesive layer is in contact with a release surface provided by a release liner or the opposed surface of the paper face stock. If provided by the opposed surface of the face stock the release used must accept cancellation inks.

In respect to the compositions of the instant invention, some paper mills regard the Tappi test as too stringent and compositions which may fail the Tappi test may still be regarded as repulpable adhesive provided they do not accumulate in the recovered paper fiber pulp.

During the course of our work, we found the acrylic emulsion adhesives of greater than 20% total acid were water-dispersible, but not inherently tacky. However, through the addition of known plasticizing and tackifying agents adhesion (looptack peel on cardboard) can be improved. These adhesives were not humidity tolerant, however and bled into 50 #EDP facestock.

At acid levels below 10%, the adhesives were inherently more tacky and showed good humidity performance i.e. no bleed under identical storage conditions. However, these systems were not repulpable by Tappi UM213 methodology.

Blending the polymers at (MAA/AA 20% and 10%) at polymer ratios of 80:20 to 95:5 gave products that marginally passed Tappi UM 213 with improved looptack adhesion to cardboard and improved bleed performance under high humidity exposure.

Individual polymers which do not pass Tappi UM 213 may pass Tappi UM 204 and are useful in markets where hot alkali repulping is employed, also polymers when blended with a polymer which passes UM213 many in the combination pass UM 213.

For instance, the sequentially polymerized E-8 above passed Tappi 204 and exhibits acceptable high-humidity bleed resistance on 50#EDP paper. Similarly, the blends of polymers E-10 (a) and (b) in proportion 80:20, when further blended with a polymer of 56.8% (weight basis) 2-EHA, 37.9% BA, 2.8% MAA, 1.9% AA,, and 0.6% itaconic acid and formed in the absence of a chain transfer agent ("Polymer B" herein) when blended in proportion of 80–20, 70–30 and 60–40, pass Tappi UM204 and high-humidity bleed at 25° C. (50#EDP) and are part of this invention.

For example certain blends of the polymer of Example E-16 and polymer B gave the results shown in Table VI.

TABLE VI

| Paper | Wt % E-16/ Polymer B | Wash- Off (Repulp) | 1 Week Aging[2] |
|---|---|---|---|
| 50#EDP Alkaline Processed Virgin, White | 60/40 | Good | Good Grab |
| Consolidated Acid Processed Yellowish Prephosphorized | 60/40 | Fair at 40° C. Good at 70° C. | Good Grab |
| Gladfelter Alkaline Processed Prephosphorized White | 60/40 | Poor at 40° C. Fair at 70° C. | No Grab Left |

[2]At 90% Rleative Humidity, 40° C.

The presently preferred composition of this invention is one containing about 85.5% by weight of the sequentially polymerized polymer of E-18, about 4.5% by weight Polymer B tackified with about 10% by weight Aquatack 6025 a rosin ester manufactured by Arizona Chemicals.

The product is fully dispersible at 100° F. and pH 8.5 which are very mild pulping conditions for paper mills. Addition of Polymer B resists bleed at 40° C. and 100% relation humidity for about 2 weeks and the tackifier improved adhesive properties. The use of vinyl acetate and methyl acrylate in equal amounts gave good cardboard adhesion, improved repulpability and reduced cost.

Surprisingly, externally. crosslinking the blended formulations with $Al(OH)_2Ac.1/3H_3BO_3$ greatly improved repulpability. Even marginally repulpable systems (like the 80:20 blend) become fully water dispersible when cross-linked.

We found that adhesive polymers formed by sequential polymerization were inherently more tacky than uncrosslinked and crosslinked polymers of the same monomer composition prepared individually or blended.

By increasing base weight of the repulpable paper to 60 pounds per ream or using coated repulpable paper such as 55 pound per ream paper stock such as 110 paper by Repap, bleed is reduced and more adhesion retained on exposure to high humidity.

What is claimed is:

1. A water-dispersible, inherently tacky pressure-sensitive adhesive comprising a mixture of emulsion polymers, each polymer formed from about 55% to 90% by weight of a first monomer which is at least one alkyl acrylate containing from 4 to about 8 carbon atoms in the alkyl group, from about 10% to about 20% by weight of a mixture of acrylic acid with at least one oleophilic unsaturated carboxylic acid, from 0% to about 15% by weight of at least one vinyl ester, and from 0% to about 15% by weight methyl acrylate, in the presence of anionic and nonionic surfactants, said mixture of emulsion polymers having a glass transition temperature of about −15° to about −50° C., and formed in the presence of a sufficient amount of chain transfer agent to provide a mixture of emulsion polymers which, when coated onto a repulpable paper substrate, is sufficiently dispersible to enable recovery of paper fibers substantially free of adhesive and capable of passing TAPPI Useful Method 204, said adhesive being resistant to loss of adhesive properties and bleed on exposure to high humidity.

2. A water-dispersible, inherently tacky pressure-sensitive adhesive comprising from 60% to 80% by weight of a mixture of sequentially polymerized emulsion polymers, polymerized in the presence of a dodecyl mercaptan from a first monomer mix comprising on a weight basis about 61% 2-ethylhexyl acrylate, 20.3% butyl acrylate, about 12.2% methacrylic acid and about 6.5% acrylic acid and a second monomer mixture of about 58.2% 2-ethylhexyl acrylate 29.1% butyl acrylate, 8.8% methacrylic acid and 3.9% acrylic acid blended with from 40 to 20% by weight acrylic emulsion polymer formed on a by weight basis of about 56.8% 2-ethylhexyl acrylate, 37.9% butyl acrylate, about 2.8% methacrylic acid, about 1.9% acrylic acid and about 0.6% itaconic acid, said mixture passing at least TAPPI UM 204 and resistant to bleed under high humidity conditions.

3. A pressure-sensitive adhesive formed by sequential emulsion polymerization and containing about 60% by weight 2-ethylhexyl acrylate, about 12.5% by weight vinyl acetate, about 12.5% by weight methylacrylate, about 13.5% by weight acrylic acid, and about 1.5% by weight methacrylic acid.

4. A pressure-sensitive adhesive as claimed in claim 1 in admixture with a positive amount up to about 40% by weight of the total mixture with a copolymer comprising at least one alkyl acrylate and less than 10% by weight of a blend of acrylic acid and at least one oleophilic carboxylic acid.

5. A pressure-sensitive adhesive as claimed in claim 3 in admixture with a positive amount up to about 40% by weight of the total mixture with a copolymer comprising at least one alkyl acrylate and less than 10% by weight of a blend of acrylic acid and at least one oleophilic carboxylic acid.

6. A pressure-sensitive adhesive as claimed in claim 1 in which the mixture further contains a tackifier.

7. A pressure-sensitive adhesive as claimed in claim 6 in which the tackifier is a rosin ester.

8. A pressure-sensitive adhesive as claimed in claim 4 in which the mixture further contains a tackifier.

9. A pressure-sensitive adhesive as claimed in claim 8 in which the tackifier is a rosin ester.

10. A pressure-sensitive adhesive as claimed in claim 1 in which the acrylic acid is present in an amount of about 5% to about 19% by weight of the polymer, and the oleophilic unsaturated carboxylic acid is present in an amount of from about 1% to about 15% by weight of the polymer.

11. A pressure-sensitive adhesive as claimed in claim 10 in which the weight ratio of acrylic acid to oleophilic unsaturated carboxylic acid is 2:3 to 7:1.

12. A pressure-sensitive adhesive as claimed in claim 1 in which the oleophilic unsaturated carboxylic acid is methacrylic acid.

13. A pressure-sensitive adhesive as claimed in claim 10 in which the oleophilic unsaturated carboxylic acid is methacrylic acid.

14. A pressure-sensitive adhesive as claimed in claim 11 in which the oleophilic unsaturated carboxylic acid is methacrylic acid.

15. A pressure-sensitive adhesive as claimed in claim 12 in which the oleophilic unsaturated carboxylic acid is methacrylic acid.

16. A pressure-sensitive adhesive as claimed in claim 12 in which the oleophilic acid is methacrylic acid in which the acrylic acid is present in an amount of from about 30% to 60% by weight of the mixture of acrylic acid and methacrylic acid.

17. A pressure-sensitive adhesive as claimed in claim 1 in which the first monomer is a mixture of a butyl acrylate with a first alkyl selected from the group consisting of 2-ethylhexyl acrylate, isooctyl acrylate and mixtures thereof.

18. A pressure-sensitive adhesive as claimed in claim 10 in which the weight ratio of first acrylate to butyl acrylate is about 3 to 1.

19. A pressure-sensitive adhesives as claimed in claim 18 in which the oleophilic acid is methacrylic acid in which the acrylic acid is present in an amount of from about 30% to about 60% by weight of the mixture of acrylic acid and methacrylic acid.

20. A pressure-sensitive adhesive as claimed in claim 1 in which the nonionic surfactant is an ethoxylated rosin acid.

21. A pressure-sensitive adhesive as claimed in claim 1 in which the anionic surfactant is a sulfated ethoxylated nonylphenol.

22. A pressure-sensitive adhesive as claimed in claim 20 in which the anionic surfactant is a sulfated ethoxylated nonylphenol.

23. A pressure-sensitive adhesive as claimed in claim 18 in which the polymer mixture is formed by sequential polymerization by addition to a pre-emulsion containing the nonionic surfactant of a first monomer pre-emulsion containing about 40% to about 80% of the total monomers and anionic followed by additive of the monomer pre-emulsifier containing the balance of the monomer and an anionic surfactant.

24. A pressure-sensitive adhesive as claimed in claim 18 in which the polymer mixture is formed by sequential polymerization in an aqueous medium containing the nonionic surfactant of a first monomer pre-emulsion containing about 80% of the total monomers and about 20% by weight of the mixture of acrylic acid and the oleophilic unsaturated carboxylic acid, followed by addition of a second monomer pre-emulsion containing the balance of the monomers and about 10% by weight of the mixture of acrylic acid and the oleophilic unsaturated carboxylic acid and anionic emulsifier.

25. A pressure-sensitive adhesive as claimed in claim 1 in which the adhesive mixture is formed of a blend of polymers.

26. A water dispersible, inherently pressure-sensitive adhesive comprising a mixture of:

(a) about 85.5% by weight of a polymer formed by sequential emulsion polymerization and containing on a weight basis, about 60% by weight 2-ethylhexyl acrylate, about 12.5% by weight vinyl acetate, about 12.5% by weight methylacrylate, about 13.5% by weight acrylic acid, and about 1.5% by weight methacrylic acid;

(b) about 4.5% by weight of an emulsion polymer containing about on a weight basis, 56.8% 2-ethylhexyl acrylate, about 37.8% by weight butyl acrylate, about 2.8% by weight methacrylic acid, about 1.9% by weight acrylic acid, and about 0.6% by weight itaconic acid; and (c) about 10% by weight of a rosin ester tackifier; said adhesive resisting bleed into paper and capable of passing TAPPI Useful Method 204.

* * * * *

UNITED STATES PATENT AND TRADEMARK OFFICE
CERTIFICATE OF CORRECTION

PATENT NO.  : 5,536,787
DATED       : July 16, 1996
INVENTOR(S) : William F. Scholz; Robert H. Van Ham It is certified that error appears in the above-indentified patent and that said Letters Patent is hereby corrected as shown below:

On the title page, Item [75], after "Inventors:" delete "William F. Scholz, Altadena; Robert H. Van Ham; Richard P. Randall, both of Pasadena, all of Calif." and insert therefor
-- William F. Scholz, Altadena; Robert H. Van Ham (Deceased), Pasadena, both of Calif. --

Column 2, line 25, change "ma" to -- may --.
Column 2, Line 39, change "arylic" to -- acrylic --.
Column 3, line 11, after "acylate" insert a comma.
Column 4, line 19, change "Concentration" to -- concentration --.
Column 5, line 4, after "reacted" change "following" to -- followed --.
Column 5, line 20, before "high" insert -- a --.
Column 5, line 51, after "coat" delete the comma.
Column 6, line 26, before "octylphenoxy" change "a" to -- an --.
Column 6, line 29, change "15.8 both" to -- 15.8. Both --.
Column 6, line 36, before "Cardboard" insert -- means --.
Column 6, line 38, change "produce" to -- produces --.
Column 6, line 46, change "CO 436" to -- CO-436 --.
Column 6, line 50, change "in-amounts" to -- in amounts --.
Column 6, line 52, after "pre-emulsion" delete "and".
Column 8, line 7, in TABLE III, change "CO436" to -- CO-436 --.
Column 8, line 52, in TABLE IV, change "PRE EMULSION" to -- PRE-EMULSION --

UNITED STATES PATENT AND TRADEMARK OFFICE
CERTIFICATE OF CORRECTION

PATENT NO. : 5,536,787
DATED : July 16, 1996
INVENTOR(S) : William F. Scholz; Robert H. Van Ham It is certified that error appears in the above-indentified patent and that said Letters Patent is hereby corrected as shown below:

Column 10, line 41, change "the Example" to -- Examples --.
Column 11, line 35, change "under surface" to -- undersurface --.
Column 11, line 44, after "used" insert -- it --.
Column 12, line 63, change "Al(OH)$_2$Ac.1/3H$_3$BO$_3$" to
  -- Al(OH)$_2$ · 1/3H$_3$BO$_3$ --.
Column 13, line 35, after "acrylate" insert a comma.
Column 14, line 31, change "adhesives" to -- adhesive --.
Column 14, line 66, ater "inherently" insert -- tacky --.
Column 15, line 9, change "about on a weight basis," to
  -- on a weight basis, about --.

Signed and Sealed this

Tenth Day of June, 1997

*Attest:*

BRUCE LEHMAN

*Attesting Officer*   Commissioner of Patents and Trademarks